United States Patent [19]
Hendrichon

[11] B 3,915,239
[45] Oct. 28, 1975

[54] TRAIL SCRAPER

[76] Inventor: Lucien Hendrichon, 373 St. Paul St., Vill de St. Gabriel, Berthier, Quebec, Canada

[22] Filed: Apr. 16, 1973

[21] Appl. No.: 351,535

[44] Published under the Trial Voluntary Protest Program on January 28, 1975 as document no. B 351,535.

[52] U.S. Cl. .................. 172/146; 37/13; 172/188; 172/197; 172/393; 172/623
[51] Int. Cl.² .................. A01B 49/02; A01B 19/04; E01H 4/00
[58] Field of Search .......... 172/613, 623, 145, 146, 172/197, 198, 199, 200, 393, 390, 392, 387, 627, 642, 652, 786, 787, 188, 195, 767, 146; 37/10, 13, 48, 122, 123

[56] References Cited
UNITED STATES PATENTS

| | | | |
|---|---|---|---|
| 126,186 | 4/1872 | Cordill | 172/623 |
| 153,214 | 7/1874 | Burgess | 172/623 |
| 239,835 | 4/1881 | Parmley | 172/176 X |
| 286,969 | 10/1883 | Smith | 37/13 |
| 686,559 | 11/1901 | Todd | 172/145 X |
| 768,170 | 8/1904 | Dorsett | 172/146 |
| 835,935 | 11/1906 | Campany | 172/623 |
| 836,540 | 11/1906 | Smith | 172/198 X |
| 1,018,785 | 2/1912 | Shank | 172/767 |
| 1,138,024 | 5/1915 | Steinfort | 172/767 X |
| 1,297,430 | 3/1919 | Winslow | 172/197 X |
| 1,368,585 | 2/1921 | Vigil | 172/145 |
| 1,404,038 | 1/1922 | McCallum | 172/145 |
| 1,429,376 | 9/1922 | Stephenson | 172/200 |
| 1,522,331 | 1/1925 | Schaeffer | 172/393 |
| 1,588,152 | 7/1926 | Wammack | 172/197 X |
| 1,861,494 | 6/1932 | Devereux | 172/199 |
| 1,962,990 | 7/1934 | Katzenberger | 172/145 |
| 2,786,283 | 3/1957 | Bradley | 172/145 X |
| 3,023,717 | 3/1962 | Cline | 172/146 X |
| 3,200,891 | 8/1965 | Marron | 172/197 X |
| 3,333,645 | 8/1967 | Gustafson | 172/413 X |
| 3,576,214 | 4/1971 | Ratcliffe | 172/393 |
| 3,739,859 | 6/1973 | White | 172/145 |

FOREIGN PATENTS OR APPLICATIONS

| | | | |
|---|---|---|---|
| 528,664 | 8/1955 | Italy | 172/623 |

*Primary Examiner*—Robert E. Bagwill
*Assistant Examiner*—Steven A. Bratlie

[57] ABSTRACT

A scraper for the snowmobile trails adapted to retain the snow onto the trail rather than to plow it aside, and also adapted to form a pair of laterally spaced-apart paths separated by a longitudinal ridge of snow, as a divided highway. A trail scraper comprising a front unit including a pair of chassis rigidly held in spaced-apart relationship, a pair of rear units connected to the front unit and towed thereby, each rear unit having a chassis, and each of the chassis having scraping blades, a leveling member and a compaction panel secured underneath thereof with the scraping blades producing central funneling of scraped snow towards the leveling member and the compaction panel which is angularly adjustable.

1 Claim, 11 Drawing Figures

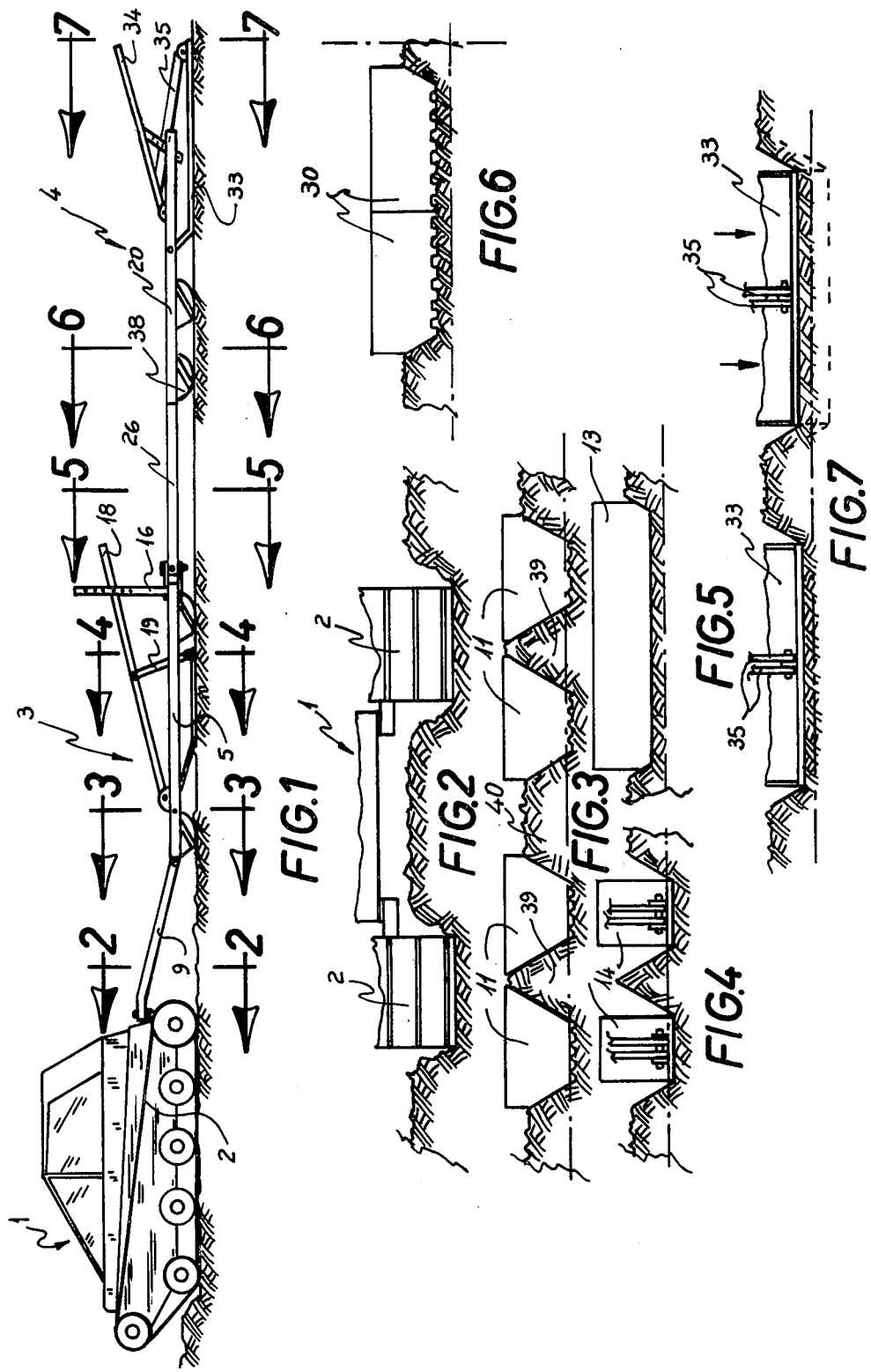

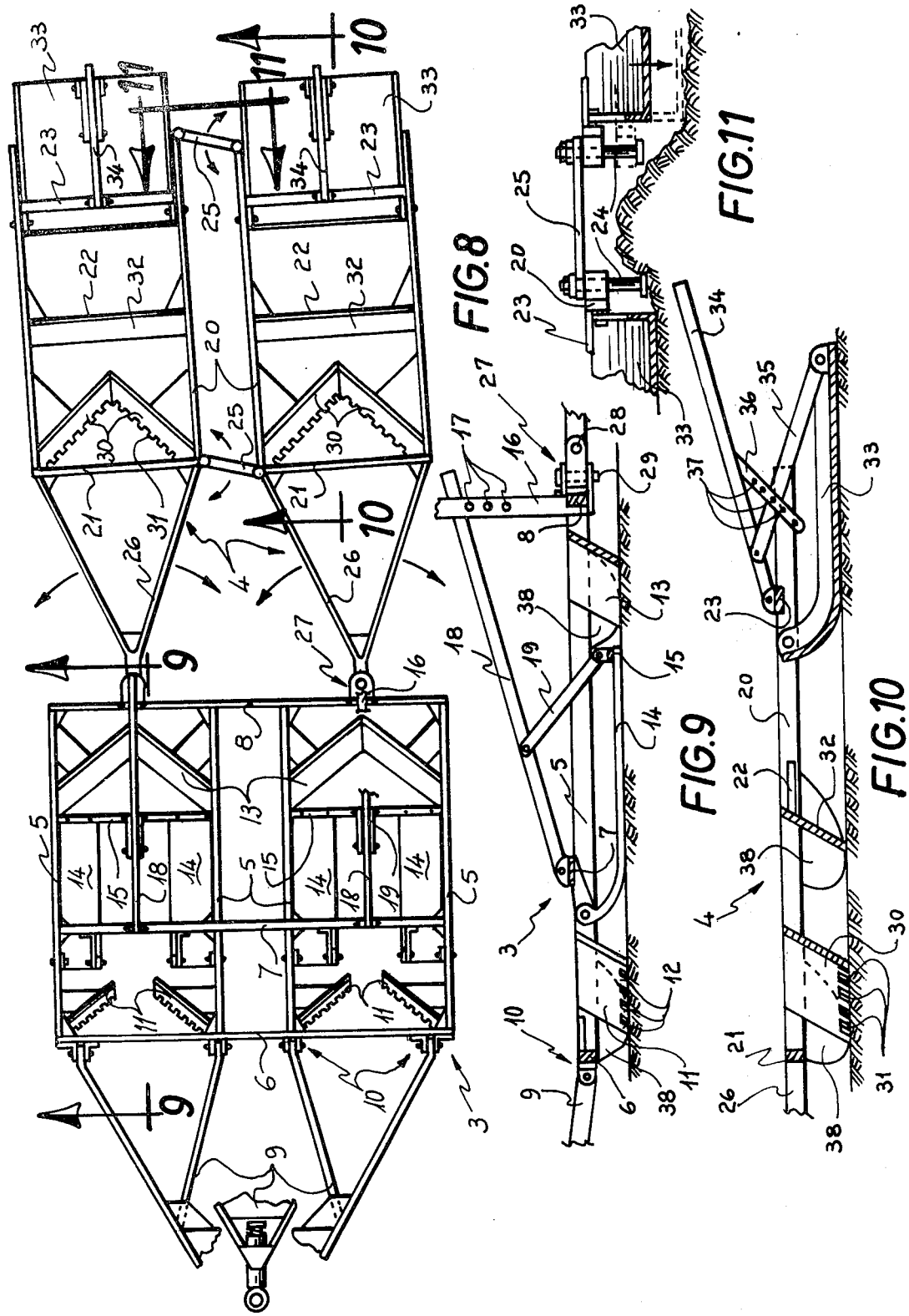

TRAIL SCRAPER

This invention relates to a scraper for trails and, more particularly, for snowmobile trails.

The trail scrapers which have been proposed so far have the major disadvantage that, upon each pass thereof, they plow snow aside, thereby producing relatively early melting in the spring of the remainder of the snow on the trail and thus a premature ending of the snowmobiling activity on such trail.

It is a general object of the invention to provide a trail scraper which avoids the above-mentioned disadvantage and which is arranged to retain the snow onto the trail for extended lasting of the latter in the spring.

It is another object of the invention to provide a trail scraper which efficiently levels off the bumps of snow produced by repeated passages of snowmobiles along a trail.

It is a further object of the invention to provide a trail scraper which is adapted to produce a trail having a pair of laterally spaced-apart paths, preferably separated by an intermediate ridge of snow for separate two-way traffic, as on a divided highway.

There are further objects of the invention to provide a trail scraper of simple and inexpensive construction, of adjustable action having independent scraping, leveling and compacting elements and adapted with runners to slide over oncoming obstacles.

The above and other objects and advantages of the invention will be better understood in the light of the following detailed description of a preferred embodiment which is illustrated, by way of example only, in the accompanying drawings, in which:

FIG. 1 is a side view of a trail scraper according to the invention attached to a tracked vehicle to be towed by the latter;

FIGS. 2 to 7 inclusive are transverse cross-sectional views through the trail scraper as seen along lines 2—2 to 7—7 inclusive in FIG. 1;

FIG. 8 is a top plan view of the trail scraper of FIG. 1; and

FIGS. 9, 10, and 11 are cross-sectional views as seen along lines 9—9, 10—10, and 11—11 in FIG. 8.

The illustrated trail scraper is adapted to be towed by a tracked vehicle 1 having a pair of endless tracks 2 arranged in spaced-apart relationship. The trail scraper includes a front unit 3 and a pair of rear units 4.

The front unit 3 includes a pair of chassis or frames, each having a pair of longitudinal beams 5 which are rigidly interconnected by transverse beams 6, 7, and 8, such that these chassis are arranged in laterally spaced-apart relationship. A hitch 9, of any suitable construction, is pivoted to the front end of the afore-mentioned chassis through aligned pins and brackets 10 secured to the transverse beam 6.

A scraping assembly is secured at the front end of each chassis of the front unit 3. These scraping assemblies include each a pair of scraping blades 11 extending transversely of the corresponding chassis and cooperatively rearwardly converging, forming a V-shaped outline. As may be seen in FIG. 1, the scraping blades 11 form a truncated V-shape and converge rearwardly forming a central gap between their inner ends. This produces a scraping which forms a ridge of scraped material or snow through that gap. The scraping blades project edgewise underneath the corresponding chassis and have a toothed lower edge 12 for better scraping into harder material, such as compacted snow.

A leveling bar 13 extends transversely of each chassis of the front unit 3 and projects underneath the latter for engagement with the snow behind the scraping assembly. The leveling bars 13 also form a V-shape outline to inwardly funnel the scraped snow.

A pair of compaction panels or plates 14, in the form of wide runners, are pivotally secured to each chassis of the front unit 3 in laterally spaced-apart relationship. A crosspiece 15 joins the rear of each pair of compaction panels or plates for bodily angular pivoting of the latter. An upright member 16 projects upwardly from the transverse beam 8 at the rear of each of the two chassis of the front unit 3. The upright member is provided with a series of adjustment holes 17. A first lever 18 is pivoted at its front end to the transverse beam 7 and projects rearwardly of the latter into cooperation with the upright member 16 for angular adjustment by a pin into one adjustment hole 17. A second lever 19 joins each crosspiece 15 to the corresponding lever 18 to transmit the pivotal movement of the latter thereto, thereby adjusting the downward projection of the compaction panels 14 relative to the corresponding chassis.

Each of the two rear units 4 includes a chassis or frame formed of longitudinal beams 20 and transverse beams 21, 22, and 23. Upright posts, or rods 24, are carried by the adjoining longitudinal beams 20 and a pair of parallel connecting bars 25 interconnect the two units 4 in spaced parallel relationship. The upright pivots 24 are upwardly slidable relative to the corresponding unit to allow relative vertical displacement between the two rear units 4. Each of the latter has a hitch 26 pivoted to the rear of a corresponding chassis of the front unit 3. A hinge 27 defines the pivotal connection between a rear unit 4 and the front unit 3 and includes a transverse and an upright pivots 28 and 29 for corresponding relative pivoting of the rear units.

Each rear unit 4 further includes a scraping assembly formed of a pair of scraping blades 30 extending transversely of the corresponding chassis and cooperatively rearwardly converging, forming a V-shaped outline. As for the front unit, the scraping blades 30 have a toothed lower edge 31 projecting downwardly underneath the chassis of the same unit. A leveling bar 32 is secured to each chassis of the units 4 and extend transversely thereof behind the scraping blades 30.

A compaction panel 33 having the outline of a wide runner is pivoted at its front end to the chassis of each unit 4 about an axis extending transversely of the latter, rearwardly of the leveling bar 32. A first lever 34 is pivoted at its front end to the transverse beam 23 and projects rearwardly thereof. A second lever 35 is pivoted at its opposite ends to the corresponding lever 34 and compaction panel 33 to transmit pivoted action to the latter. An adjustment bar 36 is connected to each set of levers 34 and 35 and is provided with adjustment holes 37 allowing to adjust the downward projection of the compaction panel 33 relative to the corresponding frame or chassis.

A runner-like body 38 forming each an upturned front end portion is secured ahead of each scraping and leveling assembly of each chassis and is arranged to slide over oncoming obstacles to allow these assemblies to slide over the latter.

As is shown by numerals 39 in FIG. 3, a ridge of snow is formed between the scraping blades 11 of each scraping assembly by the central funneling action of the scraping blades. The leveling bar 13 then serves to level off this ridge 39, as shown in FIG. 5. A similar sequence is repeated by the scraping, leveling and compacting elements of the rear units 4.

As may be easily understood, the spacing between the chassis of the front unit and the rear units produce a pair of laterally spaced-apart groomed paths or tracks separated by a longitudinal bank or ridge 40. This produces a divided highway kind of trail for two-way traffic of the snowmobiles.

I claim:

1. A trail scraper comprising a front unit and a pair of rear units, said rear units disposed side by side and trailing said front unit, said front unit including a pair of chassis rigidly joined together in laterally spaced-apart relationship, a scraping assembly and a levelling assembly rigidly secured to each of said chassis of said front unit and operatively projecting underneath thereof, said scraping assemblies of said front unit each including scraping members projecting transversely inwardly and rearwardly towards each other, and funneling scraped material towards the levelling assemblies of said front unit and runners secured to said front unit transversely adjacent the opposite sides, respectively, of each of said chassis of said front unit and having up-turned front ends for sliding over oncoming obstacles for raising said front unit for sliding thereof over said obstacles, each of said rear units comprising a chassis, a scraping assembly and a levelling assembly trailing said scraping assembly, both assemblies rigidly secured to said chassis of each rear unit and operatively projecting underneath thereof, said last-named scraping assembly including scraping members projecting transversely inwardly and rearwardly towards each other symmetrically relative to the longitudinal central axis of said chassis of each rear unit and operatively inwardly funneling scraped material towards said trailing levelling assembly, and a compaction assembly trailing said levelling assembly of each rear unit and including a panel having an upwardly curved front end portion pivoted to said chassis of each rear unit about a transverse axis and a compacting planar portion projecting rearwardly from said front end portion, hinge means joining said rear units to said front unit and defining pitch and yaw pivot axes for each of said rear units relative to said front unit, connecting means laterally joining said chassis of said rear units together side by side, said connecting means including elongated pivots upwardly carried by said chassis of said rear units, and a pair of bars pivotally and slidably connected at their opposite ends to said elongated pivots and arranged in spaced parallel relationship holding said rear units in parallel spaced-apart relationship relative one to the other and allowing up and down displacement between said rear units and said bars, and an adjustable linkage operatively connected to each compaction panel of each rear unit and to the corresponding chassis of the rear unit and arranged for pivotal adjustment of the associated compaction panel, each of said adjustable linkages including a first lever pivotally connected to the corresponding chassis and angularly adjustable relative to the latter chassis and a second lever pivotally connected at one end to the corresponding first lever, and at the other end to the corresponding compaction panel rearwardly of the corresponding transverse pivot axis and arranged to produce said pivotal adjustment.

* * * * *